Feb. 12, 1929.  
H. A. MURRAY  
1,702,219  
CLEANING, SORTING, AND WEIGHING MACHINE  
Filed June 10, 1927  4 Sheets-Sheet 1
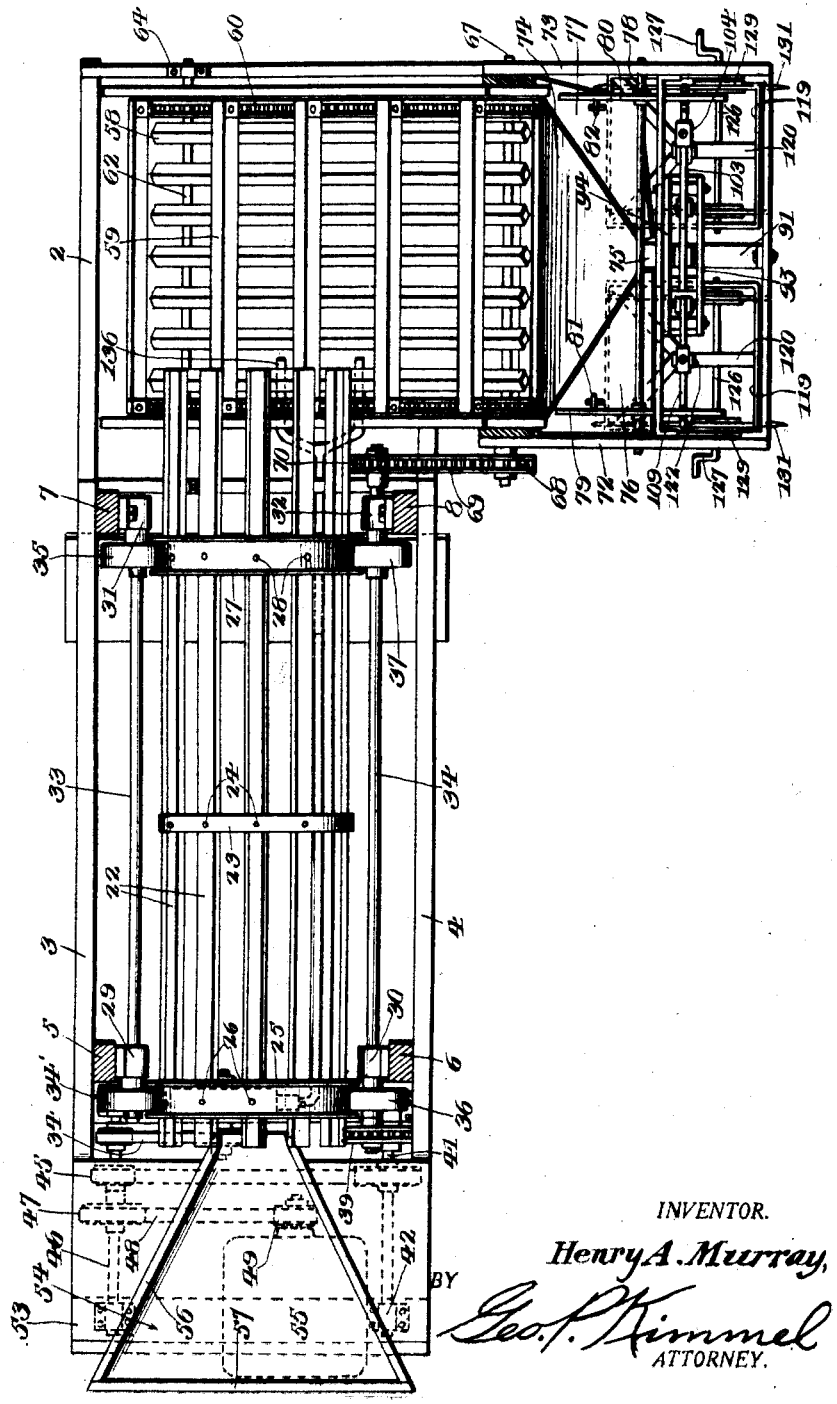
INVENTOR.  
Henry A. Murray,  
BY  
Geo. P. Kimmel  
ATTORNEY.

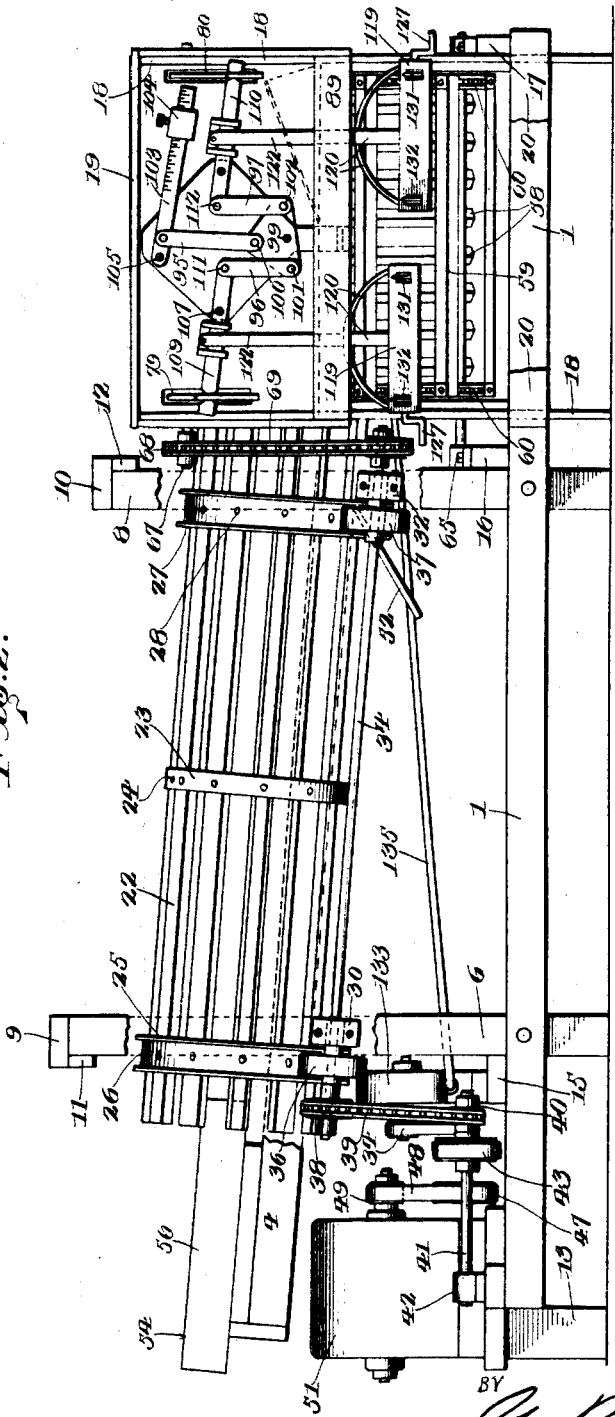

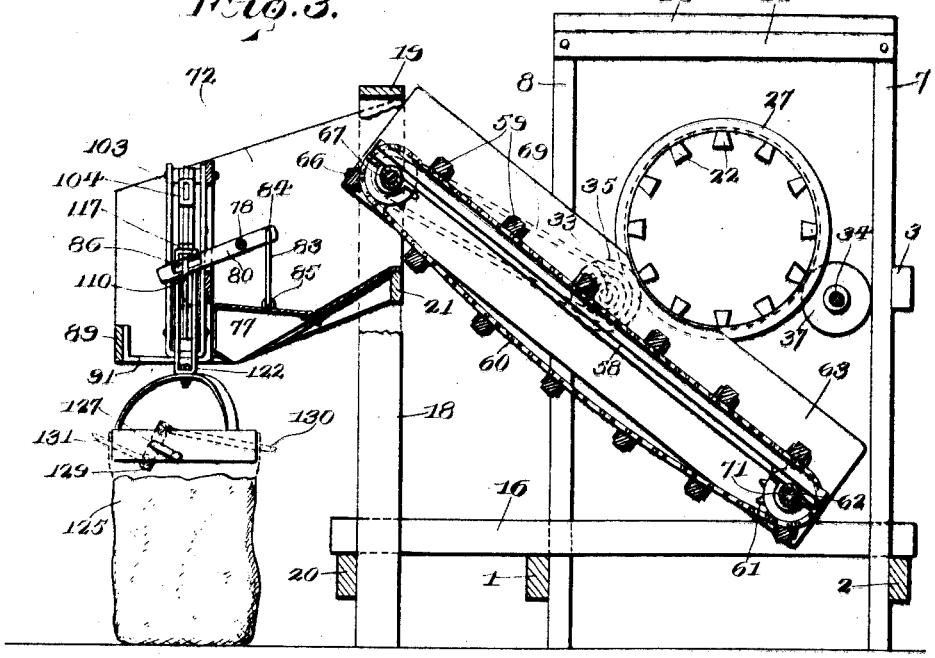
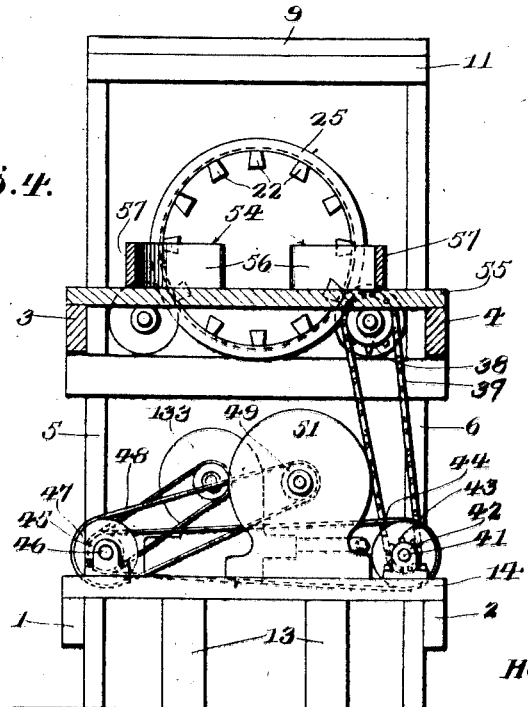

Feb. 12, 1929.　　　　　　　　　　　　　　　　　1,702,219
H. A. MURRAY
CLEANING, SORTING, AND WEIGHING MACHINE
Filed June 10, 1927　　　　　　　4 Sheets-Sheet 4
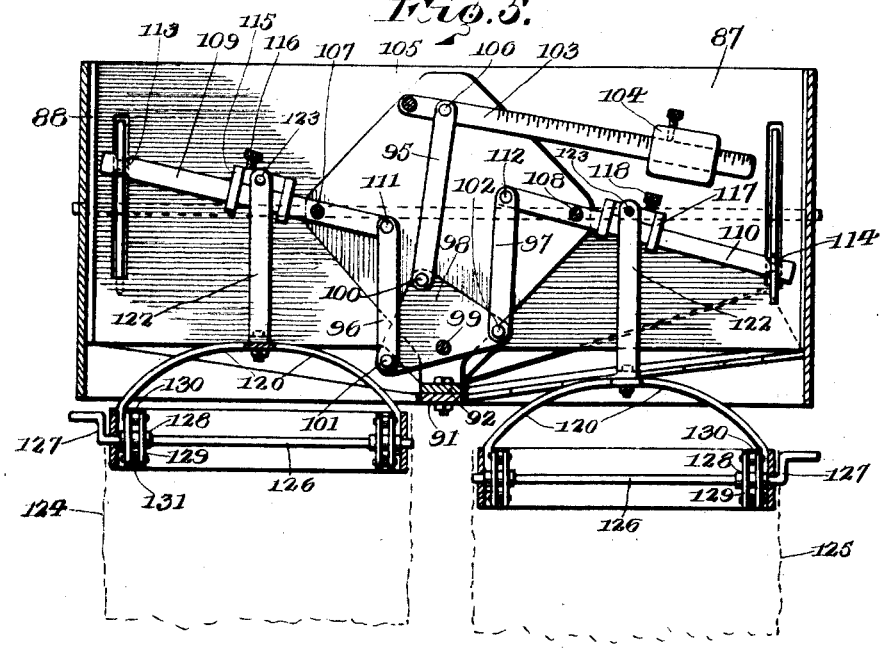
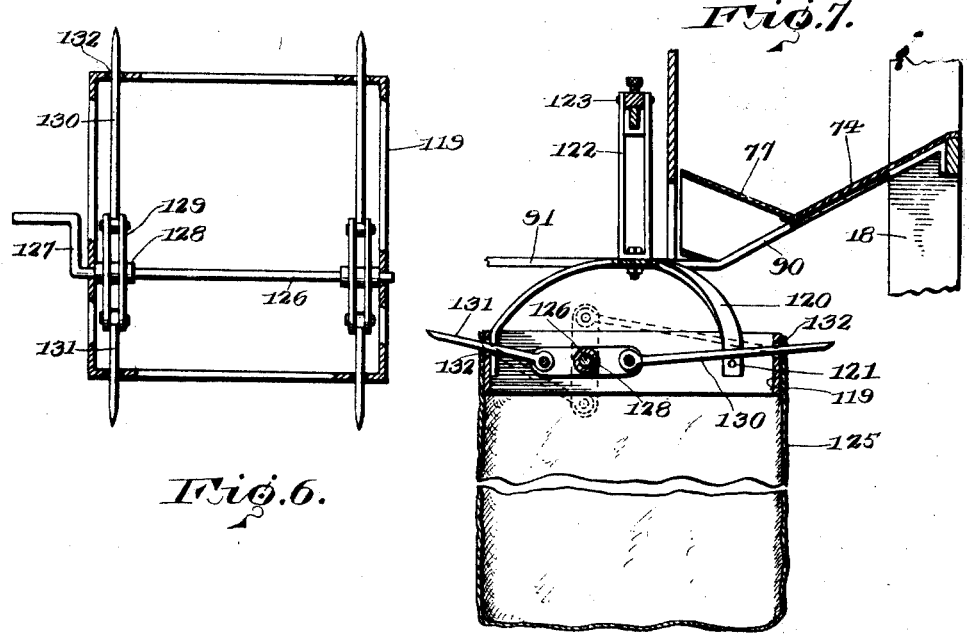
INVENTOR.
Henry A. Murray
BY
Geo. P. Kimmel
ATTORNEY.

Patented Feb. 12, 1929.

1,702,219

UNITED STATES PATENT OFFICE.

HENRY A. MURRAY, OF GARRETT, INDIANA.

CLEANING, SORTING, AND WEIGHING MACHINE.

Application filed June 10, 1927. Serial No. 197,908.

This invention relates to a sorting, cleaning, bagging and weighing machine, designed primarily for use in connection with the sorting, cleaning, bagging and weighing of onions in predetermined quantities, but it is to be understood that a machine, in accordance with this invention can be employed for any purpose for which it is found applicable, and the invention has for its object to provide, in a manner as hereinafter set forth, a machine of the class referred to for expeditiously separating a larger grade from a smaller grade of onions, and then automatically bagging the larger grades in quantities of uniform weight.

Further objects of the invention are to provide, in a manner as hereinafter set forth, a machine of the class referred to which is comparatively simple in its construction and arrangement, strong, durable, compact, thoroughly efficient in its use, readily assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a sectional plan of a combined sorting, cleaning, bagging and weighing machine in accordance with this invention.

Figure 2 is a fragmentary view in side elevation.

Figure 3 is a cross section of the machine through the conveyor, delivery and weighing mechanisms.

Figure 4 is a rear end elevation partly in section.

Figure 5 is a sectional elevation of the weighing mechanism and bag holder devices.

Figure 6 is a sectional plan of a bag holder.

Figure 7 is a fragmentary view in section illustrating the delivery mechanism and one of the bag holder devices.

A machine in accordance with this invention comprises a supporting structure upon which is mounted a conveyor mechanism, a rotatable sorter device discharging onto the conveyor mechanism, a delivery mechanism for receiving the onions from the conveyor mechanism, a pair of bag holder devices arranged in co-relation with the delivery mechanism and suspending bags for the reception of the onions from the delivery mechanism, a weighing mechanism common to said pair of bag holder devices, a conducting chute for the onions opening into the sorter device, operating means for the sorter device, a driving connection between said operating means and said conveying mechanism for operating the latter, and a cleaning means.

The supporting structure is in the form of a frame and comprises lower longitudinally extending side bars 1, 2, upper side bars 3, 4 arranged a substantial distance above the side bars 1, 2 and of less length than the latter. The side bar 1 and the side bar 2, as well as the side bars 3, 4 have secured to the inner faces thereof vertical standards 5, 6, 7 and 8. The side bars 1 and 2 project forwardly at a substantial distance from the forward ends of the side bars 3, 4. The side bars 3, 4 are disposed at a downward inclination from their rear to their forward ends. The rear terminal portions of the side bars 3, 4 are arranged over the rear terminal portions of the side bars 1, 2. The standards 5, 6 oppose each other and the standards 7, 8 oppose each other. The several standards depend below the side bars 1, 2 and constitute supports. The several standards also project a substantial distance above the side bars 3, 4. The standards 5, 6 are of greater height than the standards 7, 8. The upper ends of the standards 5, 6 are connected together by cross member 9. The upper ends of the standards 7, 8 are connected together by a cross member 10. A brace member 11 is secured to the standards 5, 6 and abuts against the cross member 9. A brace member 12 is secured to the standards 7, 8 and abuts against the cross member 10. Supporting members 13 are arranged at the rear end of the machine frame and coact with the lower side members 1, 2, for supporting a platform 14. Secured to the side members 1, 2, and abutting against the standards 5, 6 is a transverse support 15. Secured to the side members 1, 2 and abutting against the standards 7, 8, as well as arranged forwardly of these latter, is a transverse support 16. Secured upon the side members 1, 2, at the forward ends thereof, is a transverse support 17 of a length to project from the side member 1. Arranged in spaced relation with respect to the side member 1 is a vertically disposed inverted U-shaped frame having the sides thereof indicated at 18 and its top at 19. The sides of said inverted U-shaped frame are connected together by a cross piece 20 in proximity to the lower ends thereof. The transverse bar 17 is connected to the outer side 18 of the inverted U-shaped frame. The sides of the U-shaped frame are also connected, a substantial distance below the top thereof, by a transverse brace member 21. The setting up of the supporting structure in the manner as stated, provides the latter with a longitudinally extending portion and a horizontal portion.

The rotatable sorter device is arranged upon the longitudinal portion of the supporting structure and intermediate the ends of said longitudinal portion. The sorter device is furthermore positioned between the standards 5, 6 and 7, 8 and arranged a substantial distance above the side members 1, 2. The sorter device extends downwardly at an inclination from its rear or intake end to its forward or discharge end. The sorter device projects rearwardly from the standards 5, 6 and forwardly from the standards 7, 8. The sorter device comprises a hollow, slotted, cylindrical, rotatable body portion formed of a circular row of spaced slats 22 connected together at the centers thereof by an encircling band 23 through which extends holdfast devices 24 for fixedly securing the slats 22 therewith. Each of said slats in cross section gradually decreases in width outwardly thereby providing flaring passages or slots between the slats. Secured circumferentially with respect to the body portion of the sorter device, in proximity to the rear end thereof is a grooved annulus 25, through which holdfast devices 26 extend for securing the slats 22 therewith. Extending circumferentially of the body portion of the sorter in proximity to its forward end is a grooved annulus 27, through which extend holdfast devices 28 for securing the slats 22 therewith. Secured to the inner face of the standard 5 and also the standard 6 is a bearing member and said bearing members are indicated at 29, 30 and secured to the inner faces of the standards 7, 8 are bearing members 31, 32, respectively, which are arranged below the level of the bearing members 29, 30. The said several bearing members are disposed at a downward inclination from the rear to the forward ends thereof. The bearing member 29 coacts with the bearing member 31 and the bearing member 30 coacts with the bearing member 32. Extending through the bearing members 29, 31, is a shaft 33, carrying a pair of rollers 34', 35, which travel respectively in the annulii 25, 27. Extending through the bearings 30, 32 is a shaft 34 carrying a pair of rollers 36, 37 which travel respectively in the annulii 25, 27. The shafts 33, 34 are disposed at a downward inclination from the rear to the front thereof. The shaft 34 projects rearwardly from the annulus 25 and forwardly from the annulus 27. The rear end of the shaft 34 carries a gear 38 driven by a chain 39 operated from a gear 40 carried by a shaft 41, mounted in a bearing 42 and carrying a pulley wheel 43, which is driven from a belt connection 44 operated from a pulley 45, mounted on a shaft 46, which carries a pulley 47, driven from a belt connection 48, which is operated from a pulley 49, carried by a shaft 50, of a motor 51. The motor 51 is mounted on the platform 14. The rollers 36 and 37 engaging with the annulii 25 and 27 will provide for the rotation of the sorter device. The slats 22 of the sorter device are arranged a sufficient distance from each other to cause the separation of a low grade of onions from a high grade or in other words to separate a small size from a larger size and the larger sized onions will travel down the body portion of the sorter device and be discharged from the forward end thereof. Connected to the standards 7, 8, and arranged below the body portion of the sorter is an inclined deflector 52 to prevent the onions of smaller size from discharging below the forward end of the body portion of the sorter. The rotating of the body portion of the sorter, will also provide for the cleaning of the batch of onions, as they are agitated and separated on their travel through the sorter device. The rollers 34', 35 are idler rollers and in connection with the rollers 36, 37 and annulii 25, 27 support the sorter device in an inclined position during the rotation thereof.

The conducting chute, which associates with the sorter device, is provided for conducting the onions into the intake end of the body portion of the sorter device. The conducting chute is disposed at a downward inclination and comprises a bottom member 53 which is secured upon the rear end of the upper side members 3, 4. Secured to the bottom member 53 and extending rearwardly and forwardly therefrom is a receiving tray 54 which opens into the intake end of the body portion of the sorter device, see Figure 1. The tray 54 comprises a triangular shaped bottom 55, a pair of side walls 56 and a rear end wall 57. The side walls 56 extend towards each other at an inclination. The side walls 56 and rear end wall 57 are of sufficient height to have the tray receive a mass of onions and the onions are discharged from the tray through the reduced forward end thereof.

The conveyor mechanism which is arranged forwardly of the sorter device, as well as disposed at right angles with respect thereto, is disposed at an upward inclination and has its lower portion overlapped by the discharge end of the sorter device, see Figure 1. The conveyor mechanism is of the slotted type, but the slots are not of a width to permit of the passing through the conveyor mechanism of the onions of the larger size or higher grade. The conveyor mechanism includes a stationary slatted bottom 58, over which passes spaced conveyor members 59, carried by endless chains 60 which travel over sprocket wheels 61, carried by a lower shaft 62 supported in side members 63. The shaft 62 extends through the outer side member 63 and is journaled in a bearing 64, see Figure 1. The bearing 64 is carried by the transverse support 17. The shaft 62 also extends through the inner side member and is journaled in a bearing 65 carried by the transverse support 16. The shaft 62 also forms a support for the lower ends of the side members 63. The chains 64 also travel over sprocket wheels 66, carried by an upper shaft 67, which extends through the side members 63 and is journaled in the sides 18 of the inverted U-shaped frame which is spaced from the lower side member 1. The shaft 67 is extended at its rear end and provided with a sprocket gear 68, driven from a chain 69, operated by a sprocket gear 70 carried on the forward end of the shaft 34. The stationary slatted bottom 58 is connected with the shafts 62 and 67 by brackets 71, see Figure 3. The lower part of the upper end of the side member 63 extends between the sides 18 of the inverted U-frame, see Figure 3. The upper end of the conveyor mechanism extends above the sorter device, see Figure 3.

The delivery mechanism is arranged below and projects from the upper end of the conveyor mechanism and includes a pair of side members 72, 73 which are secured to the sides 18 of the inverted U-frame and project outwardly therefrom. The shaft 67 extends through the inner ends of the side members 72, 73. The side members 72, 73 are also common to the weighing mechanism and this will be hereinafter referred to. The delivery mechanism further includes a sectional bottom comprising a stationary section 74 and a pair of shiftable sections 76, 77. The stationary section 74 is of triangular contour and has projecting centrally of its forward edge a rectangular extension 75. The sections 76, 77 are also of triangular contour and the inclined sides of the sections 76, 77 are hinged to the inclined sides of the sections 74. The upper end of the conveyor mechanism discharges the onions upon the sectional bottom of the delivery mechanism and the latter is so constructed to provide for the delivery of the onions to a single bag at one time. The machine is adapted for use in connection with a pair of bags to receive the onions, and but one bag is filled at one time. The shiftable bottom sections 76, 77 provide means for directing the onions from the delivery mechanism to but one of the bags at one time. The delivery mechanism is so arranged that one of the hinged bottom sections will be elevated and the other lowered during the bag filling operation and the elevated hinged section will provide for the onions to be deflected upon the lowered hinged section and discharged therefrom into one of the bags. The hinged sections 76, 77 are alternately elevated and lowered from the weighing mechanism. The side members 72, 73 are connected together by a bar or shaft 78, upon which is pivotally mounted, in proximity to each end, a controlling bar for a hinged section of the bottom of the delivery mechanism. One of the controlling bars is indicated at 79, and the other at 80. The bar 79 is coupled with the section 76, as at 81 and the bar 80 is coupled with the section 77, as at 82. The coupling connections between the bars 79, 80 and the hinged sections 76, 77, consist of a rod 83, loosely connected at its upper end as at 84 to one of the controlling bars and its lower end loosely connected as at 85 to a hinged section of the bottom of the delivery mechanism, see Figure 3 which shows the coupling connections referred to. The extension 75 is arranged between the inner ends of the hinged sections 76 and 77, see Figure 1. The extension 75 is disconnected from the inner ends of the sections 76, 77. The outer ends of the sections 76, 77 are disconnected from the side members 72, 73. Each controlling bar 79, 80, has its forward end provided with a slot 86, and the slot in a controlling bar is indicated at Figure 3. The slots in the controlling bars 78, 80 provide means for connecting them to the weighing mechanism.

The weighing mechanism is arranged forwardly of the delivery mechanism and between the side members 72, 73 of the latter. The weighing mechanism includes a partition member 87, which is arranged between and secured to the side members 72, 73, forwardly of the shaft or rod 78. The partition member 87 is of less height than the side members 72, 73 but flush with the tops of these latter. The partition member 87 is flanged at its ends as at 88 and suitably secured to the side members 72, 73 and is positioned a substantial distance rearwardly of the outer ends of said side members. Secured between the side members 72, 73, at the lower portions of the forward ends thereof is a brace member 89. Secured to the brace member 21, projecting forwardly therefrom and connected to the brace or connecting member 89 is a support which is disposed centrally with respect to the delivery and weighing mechanisms and is formed with a downwardly inclined rear portion 90 and a horizontally disposed forward portion 91, see Figures 3 and 7. The inclined portion 90 is positioned against the stationary section of the delivery mechanism and on the horizontally disposed portion is positioned the extension 75. Secured to the horizontal portion 91 is a yoke-shaped support including a base 92 and a pair of side members 93, 94, of polygonal contour and of a height to extend in proximity to the top of the partition member 87. The width of the side members 93, 94, at the center thereof is materially greater than the width of the base 92. The side members 93, 94 project laterally with respect to the base 92 from each side thereof. Arranged between the side members 93, 94 are depending links 95, 96 and 97. Positioned between the side members 93, 94 is a triangular shaped plate 98 which is pivotally mounted, centrally of its bottom, upon a pivot 99, positioned in proximity to the lower ends of the side members 93, 94. The link 95 is pivotally connected at its lower end, as at 100 to the top of the plate 98. The link 96 is pivotally connected at its lower end, as at 101 to one lower corner of the plate 98 and the link 97 is pivotally connected, as at 102 to the other lower corner of the plate 98. Arranged between and extending from one side of the side members 93, 94 is a scale beam 103, provided with an adjustable weight 104. The scale beam 103 at its inner end is pivotally connected, as at 105 upon a pivot carried by the side members 93, 94 in proximity to the top and at one side thereof. Pivotally connected to the beam 103, in proximity to the pivot 105, is the upper end of the link 95, and the pivot between said link and scale beam is indicated at 106. Arranged at opposite corners of the side members 93, 94, are pivots 107, 108 and upon the former is mounted a lever arm 109 and upon the latter a lever arm 110. The arm 109 is mounted on the pivot 107 at a point between its transverse center and inner end and the arm 110 is mounted on the pivot 108 at a point between its transverse center and its inner end. The upper end of the link 96, is pivotally connected as at 111 to the inner end of the lever 109. The link 97 at its upper end is pivotally connected as at 112 to the inner end of the lever 110. The lever 109 has its top and bottom edges, in proximity to its outer end notched as at 113 and the notched terminal portion of the lever 109 extends through the slot 86 in the controlling bar 79. The lever 110, in proximity to its outer end is notched in its top and bottom edges, as at 114 and said notched terminal portion of the lever 110 extends through the slot 86 formed in the controlling bar 80.

Adjustable upon the lever arm 109 is a coupling member 115, carrying a set screw 116 for maintaining it in adjusted position and the coupling member 115 provides means for pivotally connecting with the lever arm 109 one of the bag holder devices. Adjustably mounted on the lever arm 110 is a coupling member 117, provided with a set screw 118 for maintaining it in adjusted position. The coupling device 117 provides means for connecting the other bag holder device to the lever arm 110. The normal position of the lever arm 109 is at an inclination and with the notched outer terminal portion thereof elevated. The normal position of the lever 110 is at an inclination and with the notched outer terminal portion thereof in lowered position. The weighted scale beam 103 provides means for shifting the lever arms 109 and 110 to the position shown in Figure 5. When the lever arm 109 is shifted to the position shown in Figure 5 it moves the controlling bar 79 for the purpose of raising the hinged sections 76 of the bottom of the delivery mechanism. When the lever arm 110 is in the position shown in Figure 5 it provides means for shifting the controlling bar 80 in a direction whereby the hinged section 77 of the bottom of the delivery mechanism will be lowered. The triangular shaped plate 98 provides means for shifting, through the medium of the weighted scale beam 103, the levers 109, 110, to the position shown in Figure 5 whereby when the outer end of the lever 109 is lowered, the hinged section 76 of the bottom of the delivery mechanism will be carried therewith and when the outer end of the lever arm 110 is elevated the hinged section 77 of the bottom of the delivery mechanism will be carried therewith or in other words elevated. When the section 77 is elevated, the onions received into the delivery mechanism will be deflected so as to be discharged into the bag at the left and when the section 76 of the bottom of the delivery mechanism is raised the onions will be directed in a direction to discharge into the bag at the right. The weighing mechanism is so arranged, that after a predetermined amount of quantity of onions has been supplied to a bag, it will be actuated so that such mechanism will elevate the empty bag and lower the full bag. The weighing mechanism shifts the bag holding devices, that is to say the pair of bag holding devices, but alternately raises one and provides for the lowering of the other. The empty bag is elevated and the filled bag lowered. After the filling of the initial bag, the weighing mechanism will be shifted from the position shown in Figure 5 and then restored to such position. The weight of the contents of the bag, which is being filled, will provide for the shifting of the weighing mechanism so that the filled bag, when it has the required weight therein, will be lowered and the other bag elevated, but after the elevation of the empty bag, the mechanism will assume the position shown in Figure 5.

As before stated, two bag holding devices are employed, and as each is of the same construction, but one will be described. Each bag holding device comprises a rectangular frame 119 to which is connected a suspension member 120 therefor and said member includes a series of arms which are fixedly secured, as at 121 to the inner face of the frame 119. Secured to the suspension member 120, centrally thereof, is a yoke shaped hanger 122, which is pivotally connected as at 123, to a coupling member 115 or 117. The bags which are indicated at 124, 125 and shown in dotted lines are adapted to have the frames 119 extend therein. Rotatably mounted in the sides of the fame 119 is a shaft 126 provided at one end with a crank handle 127. Fixed to the shaft 126, in proximity to each end thereof, is a sleeve 128, having a pair of opposed, spaced links 129 fixed thereto and between the links 129, at each end thereof is pivotally mounted a securing member and said members are indicated at 130, 131 and with the member 130 of greater length than the member 131. The shaft 126 is positioned between the transverse median of the frame 119 and one end thereof. The ends of the frame 119 are provided with openings 132 for the passage of the securing members. The shaft 126 provides means for shifting the securing members 130 and 131 to and from engagement with the bags for the purpose of connecting and releasing the bags from the frame 119. The securing members 130 and 131 also provide means for supporting the bags. The members 130 and 131 are of the necessary length so as to extend through the upper end of the bag and a substantial distance therefrom. In Figure 7 of the drawings the securing members are shown in full lines in extended or securing position and in dotted lines in contracted or released position with respect to the bag and the latter is shown in full lines in Figure 7.

It is thought that the operation of the machine can be readily understood, but it will be stated that after the onions are supplied to the sorter device, they are sorted as to size and the larger sizes of the onions are discharged onto the conveyor mechanism, and are transported to the upper end of the latter and are discharged into the delivery mechanism, and from the latter they are alternately delivered to a bag at the left and at the right. After the bag at the left, that is the bag 124 has been filled with the onions to a predetermined weight, the scale beam 103 is overbalanced and which provides for the lowering of the filled bag, and the elevating of the bag 125 and when the bag 124 lowers, the section 76 of the bottom of the delivery mechanism will be carried therewith and the section 77 elevated due to the elevation of the bag 125 and the bag holder which suspends or connects or supports the bag 125. The bag holding device for the bag 125 is vertically moved, through the medium of the lever 110 of the weighing mechanism and when said lever 110 moves upwardly, it elevates the section 77 of the bottom of the delivery mechanism so that the onions can be discharged into the bag 125. The weighing mechanism is set to be operated at a predetermined weight, and when the weight of a bag exceeds its predetermined weight the bag lowers and actuates the weighing mechanism and on the actuation of the weighing mechanism the other bag is elevated for the purpose referred to.

As the higher grade or larger sizes of onions travel up the conveyor they are subjected to a cleaning action from a blower mechanism or as termed a cleaning mechanism and which consists of a blower 133 driven from a shaft 134 carried by the shaft 46. Extending from the blower 133 is an air delivery pipe 135, provided with a pair of spaced outlets 136, see Figure 1, and which are disposed transversely with respect to the slatted bottom 62. The sorting device, conveyor mechanism and cleaning mechanism are synchronously operated from the motor 51.

It is thought the many advantages of a combined sorting, cleaning, weighing and bagging mechanism, for the purpose set forth and in accordance with this invention can be readily understood, and although the preferred embodiment of the invention is as illustrated and described, yet it is to be understood that changes in the details of construction can be had which fall within the scope of the invention as claimed.

What I claim is:

1. In a sorting, cleaning, bagging and weighing machine, in combination, an article sorting device comprising a downwardly inclined, hollow, slotted, cylindrical rotatable body portion, an annulus surrounding and secured to said body portion adjacent each end thereof and formed with a circumferentially extending groove in its outer face, a downwardly inclined driven shaft provided with a pair of rollers traveling in the grooves of said annulii for rotating said body portion, a downwardly inclined shaft provided with a pair of idler rollers traveling in the grooves of said annulii, and a deflector arranged below and in proximity to the lower end of said body portion.

2. A machine for the purpose set forth comprising a downwardly inclined rotatable article sorting device for discharging onto a conveyor mechanism and including a pair of grooved annulii exteriorly thereof and arranged in spaced relation, a downwardly inclined driven shaft provided with a pair of rollers travelling in the grooves of said annulii for operating said device, and a downwardly inclined shaft provided with a pair of idler rollers arranged in spaced relation travelling in the groove of said annulii, and said annulii permanently retaining said rollers in position.

3. A machine for the purpose set forth comprising a conveyor mechanism, a sorting device extending thereon, at right angles thereto and discharging thereon, operating means for said conveyor mechanism, a driven shaft provided with a pair of rollers rotating against said device for revolving it, a shaft provided with a pair of idler rollers for and rotating against said device, said rollers supporting said device, and a drive connection from said driven shaft to and for said operating means for said mechanism.

4. A machine for the purpose set forth comprising a conveyor mechanism, a sorting device extending thereon, at right angles thereto and discharging thereon, operating means for said conveyor mechanism, a driven shaft provided with a pair of rollers rotating against said device for revolving it, a shaft provided with a pair of idler rollers for and rotating against said device, said rollers supporting said device, a drive connection from said driven shaft to and for said operating means for said mechanism, and a platform arranged at one end of said device and including means to provide an article conducting chute extending at a downward inclination towards and into said device.

5. A machine for the purpose set forth comprising an article sorting device consisting of a body portion formed of a circular row of spaced slats and an annulus surrounding and secured to the slats in proximity to each end thereof, each of said annulii formed throughout with a circumferential groove, each of said slats in cross section gradually decreasing in width outwardly to provide flaring passages between the slats, and rotatable elements operating in said grooves for supporting and revolving said body portion.

In testimony whereof, I affix my signature hereto.

HENRY A. MURRAY.